United States Patent [19]

Naitoh et al.

[11] Patent Number: 4,797,789

[45] Date of Patent: Jan. 10, 1989

[54] SOLID ELECTROLYTIC CAPACITOR

[75] Inventors: Kazumi Naitoh; Yoshiaki Arakawa, both of Yokohama; Takashi Ikezaki, Atsugi, all of Japan

[73] Assignee: Showa Denko Kabushiki Kaisha, Tokyo, Japan

[21] Appl. No.: 50,104

[22] Filed: May 15, 1987

[30] Foreign Application Priority Data

May 16, 1986 [JP] Japan .................................. 61-110623
Dec. 27, 1986 [JP] Japan .................................. 61-309181
Mar. 2, 1987 [JP] Japan .................................. 62-45322

[51] Int. Cl.$^4$ .............................................. H01G 9/00
[52] U.S. Cl. ................................................... 361/525
[58] Field of Search ........................................ 361/433

[56] References Cited

U.S. PATENT DOCUMENTS

| 3,654,524 | 4/1972 | Puppolo et al. | 361/433 |
| 3,869,652 | 3/1975 | Maillot | 361/433 |
| 4,648,010 | 3/1987 | Naitoh et al. | 361/433 |

FOREIGN PATENT DOCUMENTS

| 12447 | 1/1979 | Japan | 361/433 |
| 1055362 | 1/1967 | United Kingdom | 361/433 |

Primary Examiner—Donald A. Griffin
Attorney, Agent, or Firm—Sughrue, Mion, Zinn, Macpeak & Seas

[57] ABSTRACT

Disclosed is a solid electrolytic capacitor comprising a plurality of superposed etched foils of a valve metal having an oxide film surface layer, which are connected with a positive electrode terminal, a semiconductor layer formed on the oxide film layer, an electroconductive layer formed on the semiconductor layer, and a negative electrode terminal common to the respective foils, which is formed on the electroconductive layer. Also disclosed is a polar type solid electrolytic capacitor in which first foils connected with a negative electrode terminal and second foils of a valve metal each having an oxide film surface layer connected with a positive electrode terminal are alternately superposed one upon the other, and a semiconductor layer is formed among the first foils and the second foils. A bipolar type solid electrolytic capacitor is also disclosed in which first valve metal foils each having an oxide film surface layer and connected with one lead terminal, and second valve metal foils each having an oxide film surface layer and connected with the other lead terminal are alternately superposed one upon the other and a semiconductor layer is formed among the first foils and the second foils.

16 Claims, 9 Drawing Sheets

SOLID ELECTROLYTIC CAPACITOR

BACKGROUND OF THE INVENTION

1. Field of the Invention

The present invention relates to a solid electrolytic capacitor of the superposed foil type having a good performance.

2. Description of the Related Art

A metal having a valve action (hereinafter referred to as "valve metal"), such as tantalum, aluminum, niobium or titanium, is used as a positive electrode substrate of the conventional solid electrolytic capacitor. Of these, tantalum and aluminum are often adopted.

For example, a solid electrolytic capacitor comprising aluminum as the positive electrode substrate has a section as shown in FIG. 1. Referring to FIG. 1, an aluminum oxide film which is a dielectric substance is formed on the surface of a sintered body of aluminum powder to form a positive electrode substrate 2. A semiconductor layer 3 is formed on this aluminum oxide film and electroconductive layers 4 and 5 are foamed on the semiconductor layer 3 to form a solid electrolytic capacitor. Manganese dioxide formed by thermal decomposition is mainly used as the semiconductor layer 3. Note, reference numerals 1 and 6 represent a positive electrode terminal and a solder layer, respectively.

However, the conventional solid electrolytic capacitor has problems in that, since thermal decomposition is carried out several times in the preparation process, the preparation steps become complicated, and the equivalent series resistance in the high-frequency band region is too large.

SUMMARY OF THE INVENTION

Under this background, it is a primary object of the present invention to provide a superior solid electrolytic capacitor having a small equivalent series resistance in the high-frequency band region.

In accordance with one fundamental aspect of the present invention, there is provided a solid electrolytic capacitor comprising a plurality of etched foils of a valve metal having an oxide film surface layer, which are connected electrically with a positive electrode terminal, a semiconductor layer formed on the oxide film layer, an electroconductive layer formed on the semiconductor layer, and a negative electrode terminal common to the respective foils, which is formed on the electroconductive layer (this solid electrolytic capacitor hereinafter referred to as "solid electrolytic capacitor of the first type").

In accordance with another aspect of the present invention, there is provided a solid electrolytic capacitor having a structure in which a plurality of first foils connected electrically with a negative electrode terminal and a plurality of second foils of a valve metal each having an oxide film surface layer, which are connected electrically with a positive electrode terminal, are alternatively superposed one upon the other, wherein a semiconductor layer is formed between the first foils connected to the negative electrode terminal and the oxide film layers of the second foils (this solid electrolytic capacitor is hereinafter referred to as "solid electrolytic capacitor of the second type").

In accordance with still another aspect of the present invention, there is provided a solid electrolytic capacitor having a structure in which a plurality of first foils of a valve metal each having an oxide film layer on the surface, which are connected electrically with one lead terminal, and a plurality of second foils of a valve metal each having an oxide film layer on the surface, which are connected electrically with the other lead terminal, are alternately superposed one upon the other, wherein a semiconductor layer is formed between the oxide film layers of the first foils and the oxide film layers of the second foils (this solid electrolytic capacitor hereinafter referred to as "solid electrolytic capacitor of the third type").

DETAILED DESCRIPTION OF THE PREFERRED EMBODIMENTS

The solid electrolytic capacitor of the present invention has a superposed foil structure, irrespective of type.

Figure 1:
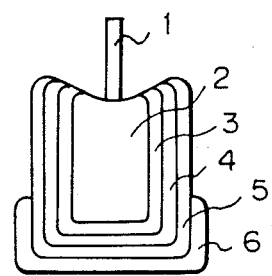
FIG. 1 is a sectional view illustrating a conventional solid electrolytic capacitor.
Figure 2:
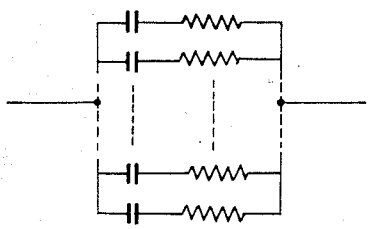
FIG. 2 is an equivalent circuit diagram of a solid electrolytic capacitor according to the present invention.

Accordingly, as shown in FIG. 2, the synthetic resistance value of the equivalent circuit of the solid electrolytic capacitor of the present invention is 1/N (N is the number of foils of each electrode) and the equivalent series resistance value in the high-frequency band region is very small. Furthermore, the preparation process is very simple and thus is industrially advantageous.

Figure 3:
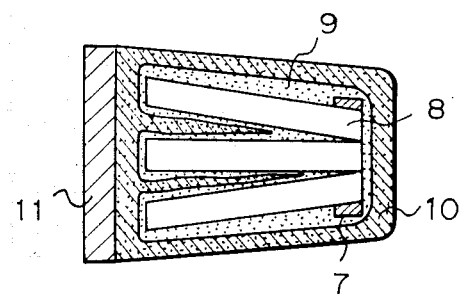
FIG. 3 is a sectional view illustrating a solid electrolytic capacitor of the first type according to the present invention.

The section of a typical example of the solid electrolytic capacitor of the first type according to the present invention is shown in FIG. 3. As shown in FIG. 3, a plurality (three in FIG. 3) of etched foils 8 having an oxide film surface layer are piled and on one side end, the foils 8 of valve metal are integrated and electrically connected with a positive electrode terminal 7. A semiconductor layer 9 is formed on the oxide film layer of each foil 8, an electroconductive layer 10 is formed on the semiconductor layer 9, and a common negative electrode terminal 11 is formed on the electroconductive layer 10.

Figure 4:
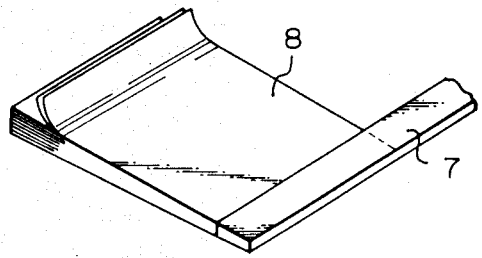
FIG. 4 is a perspective view illustrating superposed positive electrode substrates used for a solid electrolytic capacitor of the first type according to the present invention.

FIG. 4 illustrates the state where a plurality of etched foils 8 of a valve metal are superposed and on one side end, the foils 8 are integrated and electrically connected to the positive electrode terminal 7.

The solid electrolytic capacitor of the second type is a capacitor formed of so-called polar type superposed foils.

Figure 5:
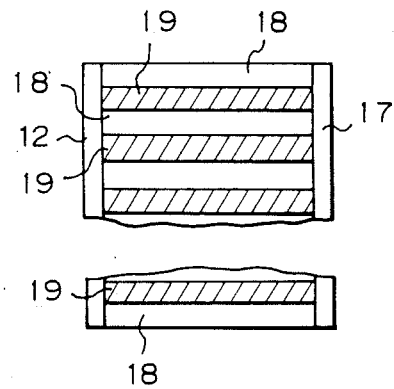
FIG. 5 is a sectional view illustrating the superposed structure in a polar type solid electrolytic capacitor.
Figure 6:
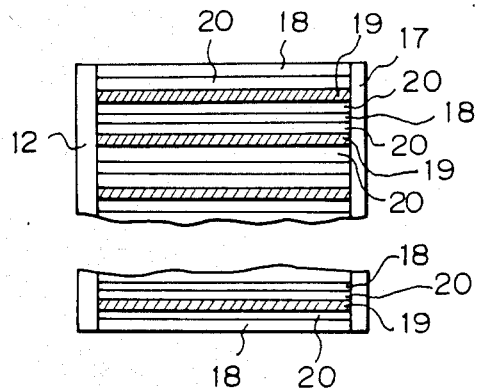
FIG. 6 is a sectional view illustrating the superposed structure of a solid electrolytic capacitor including a separator.

FIG. 5 shows the section of a typical capacitor of the polar superposed foil type, which comprises foils 18, . . . on the negative electrode side and foils 19, . . . on the positive electrode side, which are alternatively superposed in parallel. The foils 18, . . . on the negative electrode side are connected to a negative electrode terminal 17, and the foils 19, . . . on the positive electrode side are connected to a positive electrode terminal 12. FIG. 6 shows the section of a typical capacitor of the polar superposed foil type wherein a separator 20, a laminate 18 on the negative electrode side, a separator 20, a foil 19 on the positive electrode side, a separator 20, a foil 18 on the negative electrode side, . . . are superposed in sequence and in parallel. The foils 18 on the negative electrode side are connected to a negative electrode terminal 17 and the foils 19 on the positive electrode side are connected to a positive electrode terminal 12.

Figure 7:
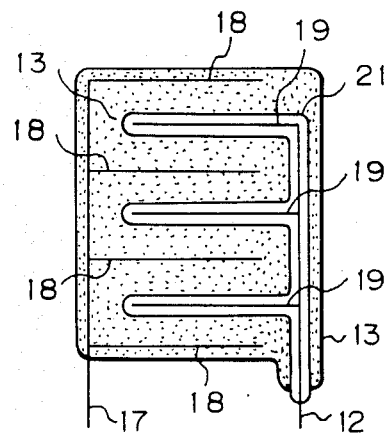
FIG. 7 is a sectional view illustrating a solid electrolytic capacitor of the second type (i.e., polar type) according to the present invention.
Figure 8:
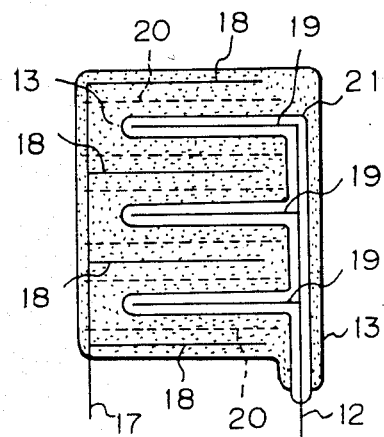
FIG. 8 is a sectional view illustrating a solid electrolytic capacitor of the second type (i.e., polar type) including separators according to the present invention.

FIG. 7 shows the section of the polar solid electrolytic capacitor of the second type according to the present invention, and FIG. 8 shows the section of a polar solid electrolytic capacitor including separators according to the present invention.

In FIG. 7, four foils 18 on the negative electrode side are connected electrically with the electrode terminal 17 and superposed and integrated with one another, and similarly, three foils 19 on the positive electrode side are connected electrically with the positive electrode 12 and superposed and integrated with one another. The number of foils 18 on the negative electrode side and the number of foils 19 on the positive electrode side are not limited to those shown in FIG. 7, but may be decided according to need. The foils 18 on the negative electrode side and the foils 19 on the positive electrode side are alternatively superposed one upon the other, and a semiconductor layer 13 is formed between oxide film layers 21 formed on the surfaces of the foils 18 and 19. The structure shown in FIG. 8 is the same as the structure shown in FIG. 7 except that a separator 20 is interposed between each adjacent foil 18 and 19 on the negative electrode and positive electrode sides. In assembling the capacitor, the oxide film layers 21 may be damaged by the contact between the foils 18 and 19 on the negative electrode and positive electrode sides. Accordingly, preferably the separators are interposed in the above-mentioned manner.

The solid electrolytic capacitor of the third type is a capacitor composed of bipolar type superposed foils.

Figure 9:
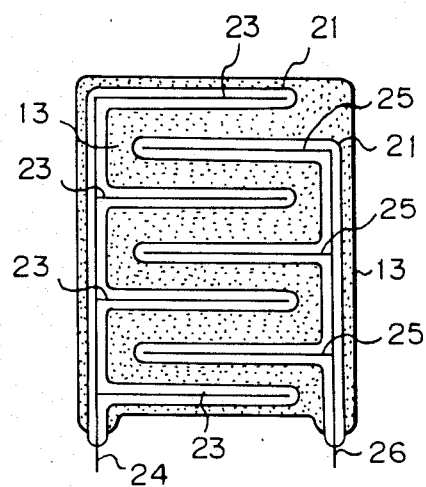
FIG. 9 is a sectional view illustrating a solid electrolytic capacitor of the third type (i.e., biopolar type) according to the present invention.
Figure 10:
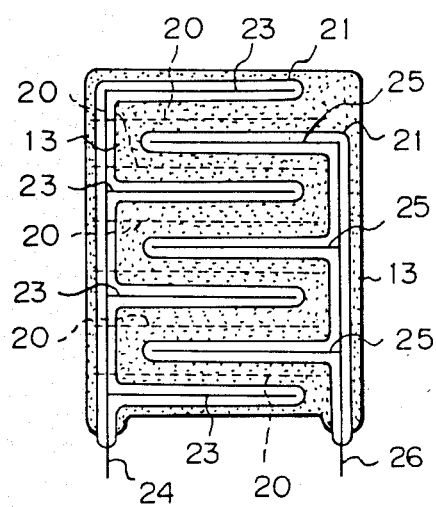
FIG. 10 is a sectional view illustrating a solid electrolytic capacitor of the third type (i.e., bipolar type) including separators according to the present invention.

FIG. 9 shows the section of a bipolar solid electrolytic capacitor of the third type according to the present invention, and FIG. 10 shows the section of a bipolar type solid electrolytic capacitor including separators according to the present invention.

Although the capacitor structure shown in FIG. 9 is similar to the structure shown in FIG. 7, an oxide film layer 21 is formed on the surface of each of the respective foils 23 and 25 connected to both lead terminals 24 and 26, respectively. This capacitor can be used as a non-polar capacitor. The structure shown in FIG. 10 is the same as the structure shown in FIG. 9 except that a separator 20 is interposed between adjacent foils 23 and 25 extending from the lead terminals 24 and 26.

The method for integrating superposed foils and interposing separators will now be described with reference to a solid electrolytic capacitor of the polar type.

Figure 11:
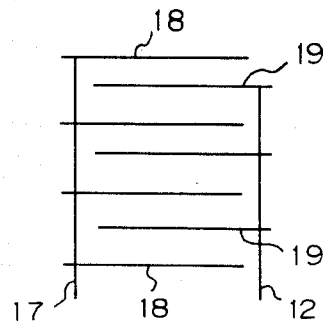
FIG. 11 is a sectional diagram illustrating a combination of foils on the negative electrode side and the positive electrode side in a solid electrolytic capacitor of the polar type.
Figure 12A:
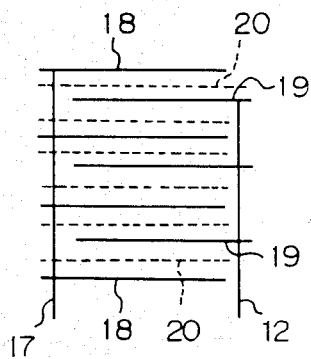
FIGS. 12A and 12B are sectional diagrams illustrating combinations of foils on the negative electrode side and the positive electrode side in a solid electrolytic capacitor of the polar type.
Figure 12B:
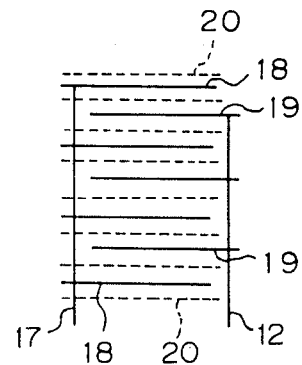

FIG. 11 is a diagram illustrating the section formed by alternately superposing foils 18 on the negative electrode side and foils 19 on the positive electrode side one upon the other. FIGS. 12A and 12B are diagrams illustrating the section formed by superposing foils 18 on the negative electrode side and foils 19 on the positive electrode side one upon the other interposing a separator 20 between each adjacent foil 18 and 19.

Figure 13A:
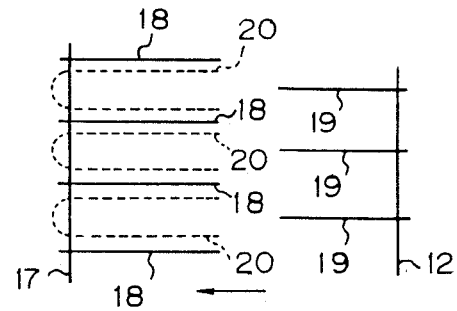
FIGS. 13A through 13G are sectional diagrams illustrating combinations of foils on the negative electrode side and the positive electrode side in a solid electrolytic capacitor of the polar type including a separator.
Figure 13:
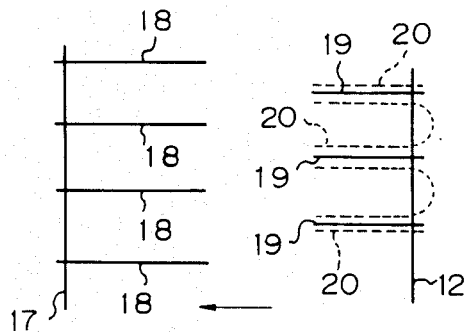
Figure 13:
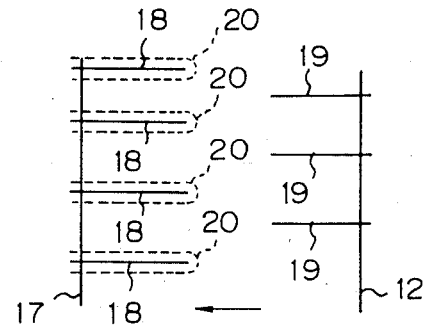
Figure 13:
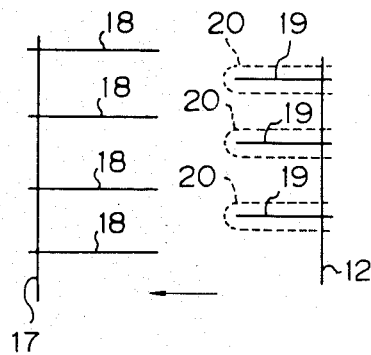
Figure 13:
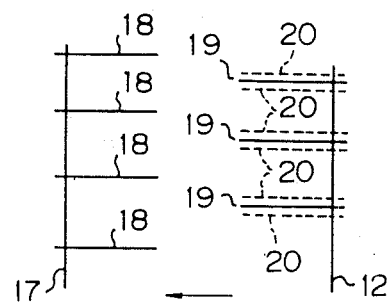
Figure 13:
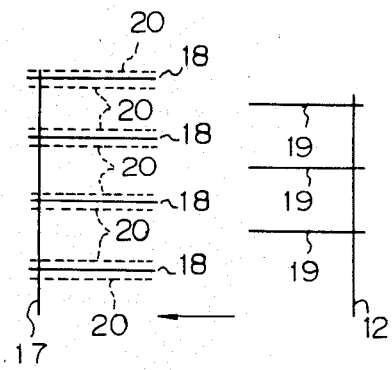
Figure 13:
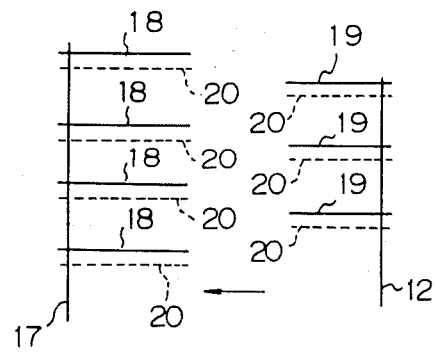

FIG. 13A is a sectional diagram illustrating an embodiment in which one separator 20 is interposed between two foils 18 on the negative electrode side, in the state where the separator 20 is folded on the side of the negative electrode terminal 17 and the foil 19 on the positive electrode side is inserted between the folds of the separator 20. FIG. 13B is a sectional diagram illustrating an embodiment in which one separator 20 is interposed between two foils 19 on the positive electrode side, in the state where the separator 20 is folded on the side of the positive electrode terminal 12 and the foil 18 is interposed between the folds of the separator 20. FIG. 13C is a sectional diagram illustrating an embodiment in which each foil 18 on the negative electrode side is inserted between folds of one separator 20 and the end of the foil 18 on the side opposite to the negative electrode is wrapped with the folded portion of the separator 20. FIG. 13D is a sectional diagram illustrating an embodiment in which each foil 19 on the positive electrode side is inserted between folds of one separator 20 and the end of the foil 19 on the side opposite to the positive electrode is wrapped with the folded portion of the separator 20. FIG. 13E is a sectional diagram illustrating an embodiment in which each foil 18 on the negative electrode side is inserted between two separators 20. FIG. 13F is a sectional diagram illustrating an embodiment in which each foil 19 on the positive electrode side is inserted between two separators 20. FIG. 13G is a sectional diagram illustrating an embodiment in which one separator 20 is interposed for each of foils 18 on the negative electrode side and foils 19 on the positive electrode side. In each of the embodiments shown in FIGS. 13A through 13G, the separator on the outside of the outermost foil not superposed with the positive electrode may be present or may not be present as shown in FIGS. 12A or 12B.

The valve metal substrate is normally used as the positive electrode, and an oxide layer is formed thereon by electrolytic oxidation. A metal per se or a metal having a thin oxide layer formed thereon is used as the negative electrode.

Also, in the bipolar capacitors of the first and second types, the foils are combined and separators are interposed in the same manner as described above with respect to the polar capacitor.

Figure 14:
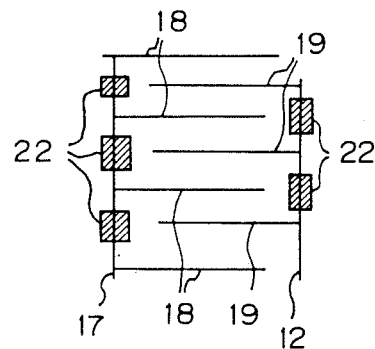
FIGS. 14A and 14B are sectional diagrams illustrating the state of interposition of spacers and the presence of spaces between electrode foils.
FIG. 14C is a sectional diagram illustrating the same combination of foils as that shown in FIG. 14B except that spacers are not interposed; and, FIGS. 15A through 15C are sectional views similar to FIGS. 14A through 14C in a solid electrolytic capacitor of the polar type including separators.
Figure 14:
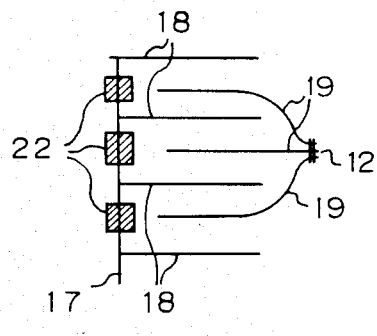
Figure 14:
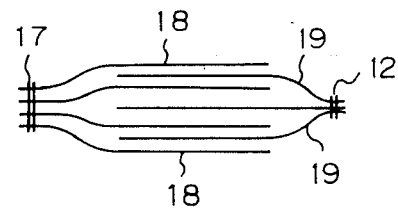

In the polar capacitor of the second type, as shown in FIG. 14A, a spacer 22 having a thickness almost equal to the thickness of the foil 19 on the positive electrode side may be interposed between foils 18 on the negative electrode side, and a spacer 22 having a thickness almost equal to the thickness of the foil 18 on the negative electrode side may be interposed between foils 19 on the positive electrode side. If this structure is adopted, the overlapping area between the foils 18 and 19 is increased, and therefore, this structure is preferable in order to ensure a sufficient capacitance in the capacitor. Furthermore, a modification may be adopted in which a spacer 22 is interposed for foils 18 on the negative electrode side or foils 19 on the positive electrode side, but a spacer is not disposed for the other foils. Moreover, foils 18 on the negative electrode side and foils 19 on the positive electrode side may be combined without using a spacer 22, as shown in FIG. 14C. Any foil material can be used as the spacer 22. A metal foil to be used as the foil on the negative or positive electrode side may be used as the spacer 22, but superposed foils having an oxide film must be made of an insulating material or an electroconductive material, the surface of which is covered with an insulating film. In order to strengthen a superposed assembly of positive electrode foils and negative electrode foils, isolation of the foils can be prevented by taping or the like.

Figure 15A:
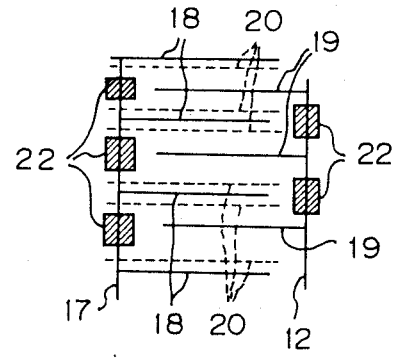
Figure 15B:
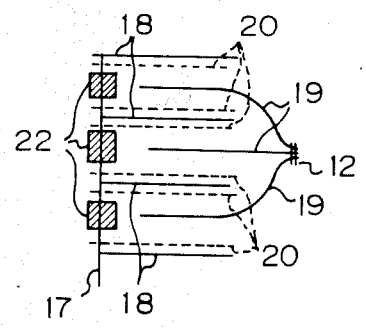
Figure 15C:
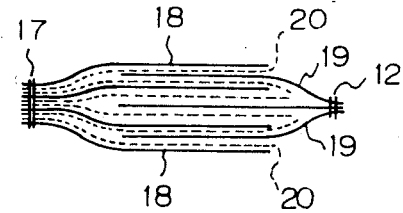

FIGS. 15A, 15B and 15C diagrammatically illustrate embodiments corresponding to FIGS. 14A, 14B and 14C, respectively, in which separators 20 are interposed between foils 18 on the negative electrode side and foils 19 on the positive electrode side.

Methods similar to the methods described above with respect to the polar capacitor may be applied to the preparation of the bipolar capacitor.

Any metal having a valve action can be used as the valve metal substrate for the positive electrode in the solid electrolytic capacitor of the first or second type (polar type) according to the present invention. For example, there can be mentioned aluminum, tantalum, niobium, titanium and alloys composed mainly thereof. In the capacitor of the third type (bipolar type) according to the present invention, any of the abovementioned valve metals can be used for each foil connected to both lead terminals. In general, the same metal is used for both foils.

From the practical viewpoint, aluminum is most preferred among the foregoing metals.

In the capacitor of the first or second type (polar type) according to the present invention, the oxide film layer on the surface of the positive electrode substrate or the negative electrode substrate may be either an oxide layer of the substrate per se or a layer of another dielectric oxide especially formed on the surface of the substrate. A layer composed of an oxide of the valve metal per se is preferred. Also in the bipolar type capacitor, an oxide film layer on the surface of the valve metal substrate is formed in the same manner as described above with respect to the polar type capacitor. In each type, a known method can be adopted for the formation of the oxide layer.

For example, where an aluminum foil is used as the substrate, if the surface of the aluminum foils is electrochemically etched and then electrochemically treated in an aqueous solution of boric acid and ammonium borate, an oxide layer composed of an alumina dielectric material is formed on the aluminum foil as the substrate.

In the polar type capacitor, the number of positive electrode foils is N (N is a positive integer) and the number of negative electrode foils is (N+1). However, where negative electrode superposed foils and positive electrode superposed foils are commonly prepared, the number of each of the negative electrode foils and the positive electrode foils is N, and although the capacitance per se is somewhat smaller than in the above-mentioned combination, the production efficiency is increased. Accordingly, N number of negative electrode foils and N number of positive electrode foils may be used in combination.

Before or after formation of the oxide film layer, the foils are superposed and bound together according to a method such as caulking or high-frequency bonding, whereby the foils are electrically connected to the terminal, and where a separator is interposed between the negative electrode foil and the positive electrode foil, the foils are superposed and bound together in the state where the separator is included.

In the present invention, the composition of the semiconductor layer or the method for forming the semiconductor layer is not particularly critical. However, in order to increase the performance of the capacitor, preferably a semiconductor layer composed mainly of lead dioxide or lead dioxide and lead sulfate is formed according to a known chemical deposition method or electrochemical deposition method. In the semiconductor layer composed mainly of lead dioxide or lead dioxide and lead sulfate, the electroconductivity is larger than $10^{-1}$ S·cm$^{-1}$ and the equivalent series resistance is further reduced.

As the chemical deposition method, there can be mentioned, for example, a method in which the semiconductor is chemically deposited from a solution containing a lead-containing compound and an oxidant.

As the lead-containing compound, there can be mentioned lead-containing compounds in which a lead atom is coordination-bonded or ion-bonded to a chelate-forming compound such as oxine, acetylacetone, pyromeconic acid, salicyclic acid, alizarin, polyvinyl acetate, a prophyrin compound, a crown compound or a cryplate compound, and lead citrate, lead acetate, basic lead acetate, lead chloride, lead bromide, lead perchlorate, lead chlorate, lead sulfate, lead silicon hexafluoride, lead bromate, lead borofluoride, lead acetate hydrate, and lead nitrate. An appropriate lead-containing compound is selected according to the solvent used for the reaction mother liquid. A mixture of two or more of the foregoing lead-containing compounds may be used.

The concentration of the lead-containing compound in the reaction mother liquid is in the range of from the concentration giving a saturation solubility of 0.05 mole/l, preferably from the concentration giving a saturation solubility to 0.1 mole/l, especially preferably from the concentration giving a saturation solubility to 0.5 mole/l. If the concentration of the lead-containing compound in the reaction mother liquid is lower than 0.05 mole/l, a solid electrolytic capacitor having a good performance cannot be obtained. If the concentration of the lead-containing compound in the reaction mother liquid exceeds the saturation solubility, no advantage is obtained by addition of the excessive amount of the lead-containing compound.

As the oxidant, there can be mentioned, for example, quinone, chloranil, pyridine-N-oxide, dimethyl sulfoxide, chromic acid, potassium permanganate, selenium oxide, mercury acetate, vanadium oxide, sodium chlorate, ferric chloride, hydrogen peroxide, benzoyl peroxide, calcium hypochlorite, calcium chlorite, calcium chlorate and calcium perchlorate. An appropriate oxidant is selected according to the solvent. A mixture of two or more of the foregoing oxidants may be used.

Preferably the oxidant is used in an amount of 0.1 to 5 moles per mole of the lead-containing compound. If the amount of the oxidant is larger than 5 moles per mole of the lead-containing compound, no economical advantage is obtained, and if the amount of the oxidant is smaller than 0.1 mole per mole of the lead-containing compound, a solid electrolytic capacitor having a good performance cannot be obtained.

As the means for forming a semiconductor layer composed mainly of lead dioxide, there can be adopted, for example, a method in which a solution containing the lead-containing compound is mixed with a solution containing the oxidant to prepare a reaction mother liquid and a foil laminate is immersed in the reaction mother liquid to chemically deposite lead dioxide on the foil laminate.

As the electrochemical deposition method, there can be mentioned a method previously proposed by us, in which lead dioxide is deposited by electrolytic oxidation in an electrolyte containing a lead ion at a high concentration (see Japanese Patent Application No. 61-26,962).

The electrolyte used for forming a semiconductor layer composed mainly of lead dioxide by electrolytic oxidation is an aqueous solution containing a lead ion or an organic solvent solution containing a lead ion. In order to improve the ion electroconductivity of the electrolyte, a known electrolytic substance may be incorporated into the electrolyte.

As the organic solvent used for formation of the organic solvent solution, any solvent capable of dissolving therein the above-mentioned compound giving a lead ion seed can be used. For example, there can be mentioned ethyl alcohol, glycerol, benzene, dioxane and chloroform. A mixture of two or more of the foregoing organic solvents may be used. Furthermore, an organic solvent having a compatibility with water may be used in the form of a mixture with water.

The lead ion concentration in the electrolyte is 0.2 mole/l to the concentration giving a saturation solubility, preferably from 0.5 mole/l to the concentration giving a saturation solubility, especially preferably from 0.9 mole/l to the solution giving a saturation solubility. If the concentration of the lead ion exceeds the level giving a saturation solubility, no advantage is obtained by an addition of an excessive amount of the lead ion. If the lead ion concentration is lower than 0.2 mole/l, because of a too low concentration of the lead ion in the electrolyte, a semiconductor layer of lead dioxide formed by electrolytic oxidation does not sufficiently adhere to the oxide layer of the positive electrode substrate, and only a solid electrolytic capacitor having a very small capacitance and a large loss coefficient is obtained.

Electrolytic oxidation can be performed according to a known method such as constant current method, a constant voltage method or a pulse method, or by adopting the constant current method and constant voltage method alternately. Known electrolytic apparatus and operation procedures may be adopted for electrolytic oxidation. The time and temperature of electrolytic oxidation are changed according to the kind of the positive electrode substrate, the substantial area of the oxide film, the kind of the lead ion seed, and the electrolytic conditions and cannot be simply defined. Preferably the time and temperature are decided based on the results of preliminary experiments.

If the semiconductor layer is constructed by a layer composed mainly of lead dioxide acting inherently as the semiconductor and lead sulfate acting as an insulating substance, the leak current value of the capacitor can be reduced. On the other hand, the incorporation of lead sulfate reduces the electroconductivity of the semiconductor layer, and therefore, the loss coefficient value is increased, but a performance much higher than that of the conventional solid electrolytic capacitor can be maintained. Namely, if the semiconductor layer is formed of a mixture of lead dioxide and lead sulfate, a good capacitor performance can be maintained within such a broad composition range that the amount of lead dioxide is 10 to 100 parts by weight and the amount of lead sulfate is up to 90 parts by weight. In order to obtain a good balance between the leak current value and the loss coefficient value, preferably the semiconductor layer is composed of a mixture comprising 20 to 50% by weight, especially 25 to 35% by weight, of lead dioxide and 80 to 50% by weight, especially 75 to 65% by weight, of lead sulfate. If the content of lead dioxide is lower than 10% by weight, the electroconductivity is reduced and the loss coefficient value is increased, and a sufficient capacitance is not manifested.

The semiconductor layer composed mainly of lead dioxide and lead sulfate can be prepared, for example, by chemical deposition using an aqueous solution containing a lead ion and a persulfate ion as the reaction mother liquid. An oxidant free of a persulfate ion may be added to the aqueous solution.

The lead ion concentration in the mother liquid is from the concentration giving a saturation solubility to 0.05 mole/l, preferably from the concentration giving a saturation solubility to 0.1 mole/l, especially preferably from the concentration giving a saturation solubility to 0.5 mole/l. If the lead ion concentration exceeds the concentration giving a saturation solubility, no advantage is obtained by an addition of an excessive amount of the lead ion. If the lead ion concentration is lower than 0.05 mole/l, because of a too low lead ion concentration in the mother liquid, the frequency of deposition of the semiconductor should be increased.

The persulfate ion concentration in the mother liquid is such that the molar ratio of the persulfate ion to the lead ion is from 5 to 0.05. If this molar ratio exceeds 5, the unreacted persulfate ion is left and the manufacturing cost is increased. If the molar ratio is lower than 0.05, the unreacted lead ion is left and the electroconductivity is reduced.

As the compound giving a lead ion seed, there can be mentioned, for example, lead citrate, lead perchlorate, lead nitrate, lead acetate, basic lead acetate, lead chlorate, lead sulfamate, silicon lead hexafluoride, lead bromate, lead chloride, and lead bromide. A mixture of two or more of these compounds giving a lead ion seed may be used. As the compound giving a persulfate ion seed, there can be mentioned, for example, potassium persulfate, sodium persulfate and ammonium persulfate. A mixture of two or more of these compounds giving a persulfate ion seed may be used.

As the oxidant, there can be mentioned, for example, hydrogen peroxide, calcium hypochlorite, calcium chlorite, calcium chlorate and calcium perchlorate.

In the solid electrolytic capacitor of the first type according to the present invention, the electroconductive layer on the semiconductor layer may be formed, for example, by solidification of an electroconductive paste, plating and metal vacuum deposition. As the electroconductive paste, there are preferably used a silver paste, a copper paste, a nickel paste, an aluminum paste and a carbon paste. These pastes may be used singly or in the form of mixtures of two or more thereof. If at least two pastes are used, they may be used in the form of a mixture, or in the form of a superposed layers. After the electroconductive paste is applied, the paste is allowed to stand in air or is heated, whereby the paste is solidified.

As the plating, there can be mentioned nickel plating, copper plating and aluminum plating. As the metal to be vacuum-deposited, there can be mentioned aluminum and copper.

The common negative electrode terminal may be attached by using an electroconductive paste or soldered onto the electroconductive layer. The assembly may be strengthened by taping or the like before or after attachment of the common negative electrode terminal.

The solid electrolytic capacitor of the present invention has a very small equivalent series resistance in the high-frequency band region and a good performance, and the volume is very small.

The solid electrolytic capacitor of the present invention can be used as a general-purpose capacitor in various fields with an exterior part such as a resin mold, a resin case, a metal case, resin dipping or a laminate film.

The present invention will now be described in detail with reference to the following examples.

EXAMPLE 1

Ten foil pieces having a length of 1 cm and a width of 0.5 cm were cut out from an aluminum foil electrochemically etched by an alternating current, and these ten pieces were superposed, a positive electrode terminal was caulked to one end of the superposed structure, and the foil pieces were electrically connected. Subsequently, the superposed assembly was electrically treated in an aqueous solution of boric acid and ammonium borate to form an aluminum oxide layer and obtain an assembly of ten formed etched aluminum foils (about 1 $\mu F/cm^2$) for a low voltage, which were combined by the positive electrode terminal. Subsequently, the assembly of the formed foils was immersed in an aqueous solution containing 1 mole/l of lead acetate and a dilute aqueous solution containing hydrogen peroxide in an amount of 0.5 mole per mole of lead acetate was added to the above aqueous solution. The foils were allowed to stand for 1 hour in this state. The lead dioxide layer precipitated on the formed foil was washed with water and dried at 120° C. under a reduced pressure. The formed foil having the lead dioxide layer deposited thereon was immersed in a silver paste bath, taken out therefrom and air-dried to form a solidified paste layer on the lead dioxide layer. The foils were bound together by taping along a width of 0.2 cm, and the end other than the end connected to the positive electrode terminal was left free. Then the end other than the end connected to the positive electrode terminal was immersed in a soldering bath and a common negative electrode terminal was connected to the free end. The assembly was then sealed with a resin to form a solid electrolytic capacitor.

EXAMPLE 2

The superposed formed foils prepared in the same manner as described in Example 1 were immersed in an aqueous solution containing 1.9 mole/l of lead nitrate, except a part of the positive electrode terminal. Electrolytic oxidation was carried out at a constant current for 10 hours by using carbon as the negative electrode to form a lead dioxide layer on the formed foil. Then, the formed foil was taken out, washed with water and dried at 100° C. under a reduced pressure for 1 hour. A solid electrolytic capacitor was then prepared in the same manner as described in Example 1.

EXAMPLE 3

An aqueous solution containing 3.8 mole/l of lead acetate trihydrate and an aqueous solution containing 4.0 mole/l of ammonium persulfate, each maintained at 50° C., were mixed, and the same formed foils as used in Example 1 were immersed in this mixed liquid and allowed to stand at 80° C. for 20 minutes. The semiconductor layers precipitated on the formed foils were washed with water to remove the unreacted substance and the foil were dried at 120° C. for 1 hour under a reduced pressure. The formed semiconductor layer consisted of lead dioxide and lead sulfate. By mass analysis, X-ray analysis and infrared spectrum analysis, it was confirmed that the semiconductor layer contained about 25% by weight of lead dioxide. A solid electrolytic capacitor was then prepared in the same manner as described in Example 1.

EXAMPLE 4

A solid electrolytic capacitor was prepared in the same manner as described in Example 3 except that the concentration of ammonium persulfate was changed to 0.3 mole/l at the step of forming the semiconductor layer. It was confirmed that the semiconductor layer consisted of lead dioxide and lead sulfate and the content of lead dioxide was about 35% by weight.

EXAMPLE 5

A solid electrolytic capacitor was prepared in the same manner as described in Example 3 except that aqueous hydrogen peroxide having a concentration of 0.05 mole/l was added at the step of forming the semiconductor layer. It was confirmed that the semiconductor layer consisted of lead dioxide and lead sulfate and the content of lead dioxide was 50% by weight.

COMPARATIVE EXAMPLE 1

(CAPACITOR SHOWN IN FIG. 1)

An oxide film was formed on a known sintered body of aluminum powder as the positive electrode substrate, and the operation of immersion in an aqueous solution of manganese nitrate and thermal decomposition was carried out 3 times to form a semiconductor composed of manganese dioxide. Then, a carbon paste and a silver paste were applied and dried, and the assembly was immersed in a soldering bath and sealed with a resin to obtain a solid electrolytic capacitor.

The properties of the capacitors prepared in Examples 1 through 5 and Comparative Example 1 are shown in Table 1.

TABLE 1

|  | Capacitance ($\mu$F) | tan $\delta$* (%) | ESR** ($\Omega$) | ESR*** ($\Omega$) |
| --- | --- | --- | --- | --- |
| Example 1 | 6.1 | 3.4 | 7.3 | 0.1 |
| Example 2 | 5.9 | 4.2 | 9.2 | 0.09 |
| Example 3 | 7.0 | 2.9 | 5.3 | 0.08 |
| Example 4 | 6.8 | 2.6 | 5.1 | 0.08 |
| Example 5 | 6.6 | 2.2 | 4.5 | 0.07 |
| Comparative Example 1 | 6.0 | 5.2 | 11.0 | 0.4 |

Note
*as measured at 120 Hz
**Equivalent series resistance as measured at 120 Hz
***Equivalent series resistance as measured at 20 KHz

EXAMPLE 6

Five small pieces of an aluminum foil for a negative electrode, which had a length of 1 cm and a width of 0.5 cm, were superposed without using a spacer and one end of the laminate was caulked to a negative electrode terminal to electrically connect the foil pieces. Separately, four small pieces having a length of 1 cm and a width of 0.5 cm were cut from an aluminum foil etched electrochemically by an alternating current, and these small pieces were superposed without using a spacer and a positive electrode terminal was caulked to one end of the laminate to electrically connect the foil pieces. The superposed assembly was electrochemically treated in an aqueous solution of boric acid and ammonium borate to form an aluminum oxide layer and obtain an assembly of four formed etched aluminum foils (about 1 $\mu$F/cm$^2$) for a low voltage, which were connected by the positive electrode terminal. Subsequently, the formed etched aluminum foils as the positive electrode were inserted one by one between the above-mentioned integrated negative electrode foils to form an assembly in which the positive electrode foils and the negative electrode foils were alternately superposed. A part of the assembly was bound by taping to prevent deviation of the positions of the negative electrode foils. The assembly was immersed in an aqueous solution containing 1 mole/l of lead acetate and a dilute aqueous solution containing hydrogen peroxide in an amount of 0.5 mole per mole of lead acetate was added to the above aqueous solution. The assembly was allowed to stand for 1 hour in this state. The lead dioxide layer precipitated on the assembly was washed with water and dried at 120° C. under a reduced pressure. This operation was repeated 2 times, and the assembly was sealed with a resin except the terminal portions to obtain a solid electrolytic capacitor.

EXAMPLE 7

Five aluminum foil small pieces for the negative electrode, which had a length of 1 cm and a width of 0.5 cm, and eight polypropylene nets having a length of 1.2 cm and a width of 0.6 cm (50 $\mu$m) in thickness) as separators, were prepared. These aluminum foil small pieces and separators were superposed without using a spacer so that two separators were interposed between each adjacent small piece. A negative electrode terminal was caulked to one end of the laminate to electrically connect the foil pieces. Separately, four small pieces having a length of 1 cm and a width of 0.5 cm were cut from an aluminum foil etched electrochemically, and these small pieces were superposed without using a spacer and a positive electrode terminal was caulked to one end of the assembly to electrically connect the foil pieces. The assembly was electrochemically treated in an aqueous solution containing boric acid and ammonium borate to form an aluminum oxide layer and obtain four formed etched aluminum foils (about 1 $\mu$F/cm$^2$) for a low voltage, which were partially integrated by the positive electrode terminal. Subsequently, the formed etched aluminum foils as the positive electrode were inserted one by one between the above-mentioned partially integrated foils as the negative electrode to form an assembly in which the foils as the positive electrode and the foils as the negative electrode were alternately superposed in parallel. In the same manner as described in Example 6, a lead dioxide layer was formed on the assembly and the assembly was post-treated to obtain a solid electrolytic capacitor.

EXAMPLE 8

A solid electrolytic capacitor was prepared in the same manner as described in Example 6 except that a liquid mixture of an aqueous solution containing 3.8 mole/l of lead acetate trihydrate and an aqueous solution containing 4.0 mole/l of ammonium persulfate was used as the solution for formation of the semiconductor layer. By mass analysis, X-ray analysis and infrared spectrum analysis, it was confirmed that the formed semiconductor layer consisted of lead dioxide and lead sulfate and the content of lead dioxide was about 25% by weight.

EXAMPLE 9

A solid electrolytic capacitor was prepared in the same manner as described in Example 7 except that rayon separators were used instead of the polypropylene nets and a liquid mixture of an aqueous solution containing 3.8 mole/l of lead acetate trihydrate and an aqueous solution containing 4.0 mole/l of ammonium persulfate was used as the solution for formation of the semiconductor layer. By mass analysis, X-ray analysis and infrared spectrum analysis, it was confirmed that the formed semiconductor layer consisted of lead dioxide and lead sulfate and the content of lead dioxide was 25% by weight.

EXAMPLE 10

A solid electrolytic capacitor was prepared in the same manner as described in Example 8 except that aqueous hydrogen peroxide having a concentration of 0.05 mole/l was added at the step of forming the semiconductor layer. It was confirmed that the semiconductor consisted of lead dioxide and lead sulfate and the content of the lead dioxide was about 50% by weight.

EXAMPLE 11

A solid electrolytic capacitor was prepared in the same manner as described in Example 9 except that aqueous hydrogen peroxide having a concentration of 0.05 mole/l was added at the step of forming the semiconductor layer. It was confirmed that the semiconductor layer consisted of lead dioxide and lead sulfate and the content of lead dioxide was about 50% by weight.

EXAMPLE 12

A solid electrolytic capacitor was prepared in the same manner as described in Example 8 except that aluminum foils having a length of 0.1 cm and an aluminum foil of 0.5 cm were integrated as spacers at the step of forming the partially integrated assembly of the formed aluminum foils.

EXAMPLE 13

A solid electrolytic capacitor was prepared in the same manner as described in Example 9 except that aluminum foils having a length of 0.1 cm and a width of 0.5 cm were incorporated as spacers at the step of forming the partially integrated assembly of the formed aluminum foils.

COMPARATIVE EXAMPLE 2

A solid electrolytic capacitor was prepared in the same manner as that in Comparative Example 1 except that a sintered body of aluminum powder having a smaller size was adopted.

The properties of the capacitors prepared in Examples 6 through 13 and Comparative Example 2 are shown in Table 2.

TABLE 2

|  | Capacitance ($\mu$F) | tan $\delta$* (%) | Equivalent Series Resistance** ($\Omega$) |
|---|---|---|---|
| Example 6 | 1.7 | 3.5 | 0.34 |
| Example 7 | 1.9 | 3.2 | 0.28 |
| Example 8 | 2.2 | 4.2 | 0.46 |
| Example 9 | 2.4 | 4.0 | 0.23 |
| Example 10 | 1.8 | 3.7 | 0.47 |
| Example 11 | 2.0 | 3.5 | 0.29 |
| Example 12 | 2.2 | 4.2 | 0.35 |
| Example 13 | 2.4 | 4.0 | 0.22 |
| Comparative Example 2 | 2.1 | 4.6 | 0.82 |

Note
*as measured at 120 Hz
**as measured at 10 KHz

We claim:

1. A solid electrolytic capacitor comprising a plurality of superposed etched foils of a valve metal having an oxide film surface layer, which are electrically connected with a positive electrode terminal, a semiconductor layer formed on the entire surface of the oxide film layer, an electroconductive layer formed on the entire surface of the semiconductor layer, and a negative electrode terminal common to the respective foils, which is formed on the electroconductive layer.

2. A solid electrolytic capacitor as set forth in claim 1, wherein the semiconductor layer is a layer composed mainly of lead dioxide.

3. A solid electrolytic capacitor as set forth in claim 2, wherein the semiconductor layer composed mainly of lead dioxide is a layer electrochemically precipitated from a reaction mother liquid containing a lead ion.

4. A solid electrolytic capacitor as set forth in claim 2, wherein the semiconductor layer composed mainly of lead dioxide is a layer chemically precipitated from a reaction mother liquid comprising a lead-containing compound and an oxidant.

5. A solid electrolytic capacitor as set forth in claim 4, wherein the concentration of the lead-containing compound in the reaction mother liquid is from 0.05 mole/l to the concentration giving a saturation solubility and the amount of the oxidant is 0.1 to 5 moles per mole of the lead-containing compound.

6. A solid electrolytic capacitor as set forth in claim 1, wherein the semiconductor layer is a layer composed mainly of lead dioxide and lead sulfate.

7. A solid electrolytic capacitor having a structure in which a plurality of first foils connected electrically with a negative electrode terminal and a plurality of second foils of a valve metal each having an oxide film surface layer on the surface, which are connected electrically with a positive electrode terminal, are alternately superposed one opon the other, wherein a semiconductor layer is formed between the first foils connected to the negative electrode terminal and the oxide film layers of the second foils such that the semiconductor layer covers the entire surface of the oxide film layers.

8. A solid electrolytic capacitor as set forth in claim 7, wherein separators are interposed between each first foil connected to the negative electrode terminal and the second foils connected to the positive electrode terminal, which are adjacent to said first foil on both sides, respectively.

9. A solid electrolytic capacitor as set forth in claim 7 or 8, wherein the semiconductor layer is a layer composed mainly of lead dioxide.

10. A solid electrolytic capacitor as set forth in claim 7 or 8, wherein the semiconductor layer is a layer composed mainly of lead dioxide and lead sulfate.

11. A solid electrolytic capacitor as set forth in claim 7, wherein a spacer is interposed between two adjacent first foils connected to the negative electrode terminal and a spacer is interposed between two adjacent second foils connected to the positive electrode terminal.

12. A solid electrolytic capacitor having a structure in which a plurality of first foils of a valve metal each having an oxide film layer on the surface thereof, are connected electrically with one lead terminal, and a plurality of second foils of a valve metal each having an oxide film layer on the surface thereof, which are connected electrically with the other lead terminal, are alternately superposed one upon the other, wherein a semiconductor layer is formed between the oxide film layers of the first foils and the oxide film layers of the second foils such that the semiconductor layer covers the entire surface of the oxide film layers.

13. A solid electrolytic capacitor as set forth in claim 12, wherein separators are interposed between each first valve metal foil having said one lead terminal and second valve metal foils having said other lead terminal, which are adjacent to said first valve metal foil.

14. A solid electrolytic capacitor as set forth in claim 12 or 13, wherein the semiconductor layer is a layer composed mainly of lead dioxide.

15. A solid electrolytic capacitor as set forth in claim 12 or 13, wherein the semiconductor layer is a layer composed mainly of lead dioxide and lead sulfate.

16. A solid electrolytic capacitor as set forth in claim 12, wherein spacers are interposed between each first valve metal foil having said one lead terminal and the adjacent second valve metal foils having said other lead terminal.

* * * * *